US006988174B1

(12) United States Patent
Yamashita

(10) Patent No.: US 6,988,174 B1
(45) Date of Patent: Jan. 17, 2006

(54) METHOD OF CREATING A PLURALITY OF PARTITIONS ON REMOVABLE DEVICE

(75) Inventor: Akiyoshi Yamashita, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/700,474

(22) PCT Filed: Mar. 15, 2000

(86) PCT No.: PCT/JP00/01569

§ 371 (c)(1),
(2), (4) Date: Feb. 5, 2001

(87) PCT Pub. No.: WO00/55719

PCT Pub. Date: Sep. 21, 2000

(30) Foreign Application Priority Data

Mar. 18, 1999 (JP) ................................ 11/073355

(51) Int. Cl.
G06F /12 (2006.01)
(52) U.S. Cl. ........................ 711/153; 711/115
(58) Field of Classification Search ................ 711/153, 711/111–115; 709/321–327
See application file for complete search history.

(56) References Cited

U.S. PATENT DOCUMENTS

| 5,408,630 A | * | 4/1995 | Moss | 711/112 |
|---|---|---|---|---|
| 5,692,190 A | * | 11/1997 | Williams | 713/2 |
| 5,815,705 A | | 9/1998 | Slivka et al. | 713/2 |
| 6,031,698 A | * | 2/2000 | Bar | 360/134 |
| 6,205,527 B1 | * | 3/2001 | Goshey et al. | 711/162 |
| 6,226,711 B1 | * | 5/2001 | Fisher et al. | 711/111 |
| 6,243,790 B1 | * | 6/2001 | Yorimitsu | 711/112 |
| 6,385,707 B1 | * | 5/2002 | Maffezzoni | 711/162 |
| 6,654,881 B2 | * | 11/2003 | Cabrera et al. | 713/100 |

FOREIGN PATENT DOCUMENTS

| JP | 7-160622 | 6/1995 |
|---|---|---|
| JP | 9-198656 | 7/1997 |

OTHER PUBLICATIONS

White, R. Re: HELP: SyJet and Drive letter Assignment Problem. [Online] news://alt.syquest, Oct. 6, 1998.*
SyquestRepair.com—Driver for Windows 95 & 98 [Online] http://www.syquestrepair.com/driver.html.*
Bruss, M. Re: how many partitions can fat16 handle? [Online] news://comp.os.ms-windows.win95.misc, Jan. 12, 1998.*
Microsoft Windows 95 Resource Kit, Microsoft, 1995, pp. 652-653, 690.*
Microsoft Windows 95 Resource Kit, Microsoft, 1995, pp. 647-653, 690.*
Japanese search report for PCT/JP00/01569 dated May 23, 2000.
English translation of Form PCT/ISA/210.
Randy Dykhuis, "Compression with Stacker and DoubleSpace", Computers in Libraries, vol. 13, No. 5, pp. 27-29 (1993).
Australian Search Report for SG 0006441-0 dated Sep. 14, 2001.

* cited by examiner

*Primary Examiner*—B. James Peikari
*Assistant Examiner*—Woo H. Choi
(74) *Attorney, Agent, or Firm*—RatnerPrestia

(57) ABSTRACT

A method is provided for creating a plurality of partitions on a removable medium of a removable device connected to a computer system. When the computer is started (S1), the operating system and a device driver communicate with each other (S2). The device driver provides a plurality of drive letters for the removable device, so that the media is divided into partitions corresponding to the number of the drive letters. A drive for a media with fewer partitions is regarded to have no media loaded.

8 Claims, 4 Drawing Sheets

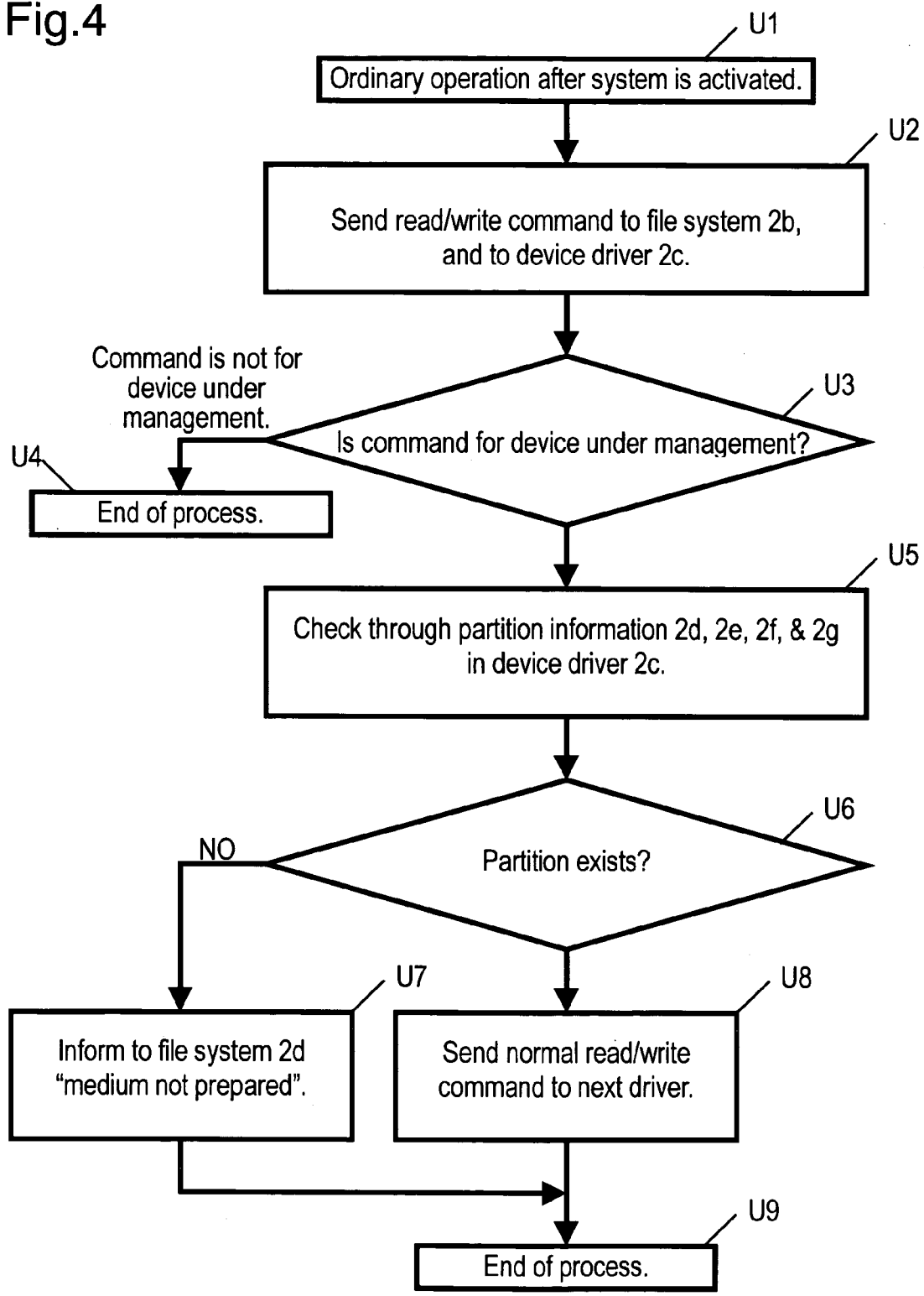

METHOD OF CREATING A PLURALITY OF PARTITIONS ON REMOVABLE DEVICE

This application is a U.S. national phase application of PCT International application PCT/JP/00/01569.

FIELD OF THE INVENTION

The present invention relates to a digital computer in general/a data processing device (international patent classification G06F 15/00) capable of managing a mass storage area through a realization of interchangeability of recording media by means of a device driver to make an operation system recognize a removable device as a plurality of devices.

BACKGROUND OF THE INVENTION

In a conventional device driver, when a plurality of record partitions (hereinafter referred to simply as "partition") are allocated on a recording medium (hereinafter referred to simply as "medium") loaded in a removable device such as a DVD-RAM device, drive letters managed by an operating system are changed every time the medium is replaced if a replacement medium is allocated with a different number of partitions. That is, in the case of an operating system not capable of changing drive letters dynamically at each time the medium is replaced, it can not manage the drive letters with regard to partitions in each of the devices and a variety of other devices besides that device.

It is therefore necessary for both of the loaded medium and the replacement medium to have only one partition. Or, the computer system has had to be turned off once, when a medium having a number of partitions different from that of the loaded medium is replaced.

In other words, it has often been a common practice to use interchangeable media having one partition as described above, rather than dividing them with partitions, when the computer system is operated by the current operating system.

However, there has been a problem that it is not possible to read linked data, when a drive letter for the same device is changed every time the medium loaded in the removable device is replaced.

Moreover, there has been a demand in recent years for devices that do not require restarting of a computer system, when the devices are newly connected thereto. Such devices include those devices that conform to new standards such as the USB and the IEEE-1394. It is a retrogressive movement against the times, if a restart is needed every time a medium loaded in the removable device is replaced.

In addition, there has been advancement of recording media toward larger capacity, and DVD-RAM devices and the like are spreading widely for use with interchangeable media. When it becomes possible for one medium to record a large mass of data, storage areas (holder names) of the data, which have otherwise been stored in a plurality of media in the past, tend to overlap easily. Therefore, there has been a demand that data need to be arranged separately into divided partitions according to their categories.

DISCLOUSURE OF THE INVENTION

In order to solve the above problem, a method of the present invention to form a plurality of partitions in a removable device comprises the steps of:

rendering a device driver to make an operation system recognize a DVD-RAM device as if there were connected a plurality of drives like 2 GB+2 GB+1.2 GB; and managing a replaced medium as a single drive, if there is only one partition in the medium, and treating the two remaining drives as not loaded with any media.

The above method of creating partitions is adaptable even for the FAT file system such as the Windows (registered trademark of Microsoft Corporation, U.S.A.), for example.

The present invention pertains to a method of creating a plurality of partitions in a removable device, which is characterized by:

communicating between an operating system and its device driver in a computer system supporting connection of a removable device; and allocating a plurality of drive letters to a single unit of the removable device, when the device driver allocates drive letters to the operating system.

This method of the invention provides one partition for each drive by having the single unit of removable device recognized as a plurality of drives, regardless of presence or absence of a medium loaded in the removable device. Accordingly, a plurality partitions can be thus formed in the removable device.

BRIEF DESCRIPTION OF THE DRAWINGS

FIG. 4 is still another flow chart showing an operation when the operating system or a file system issues read/write commands to the device driver, after activation of the computer system in the exemplary embodiment of this invention.

DESCRIPTION OF THE PREFERRED EMBODIMENTS

An exemplary embodiment of the present invention will be described hereinafter with reference to FIG. 1 through FIG. 4.

Figure 1:
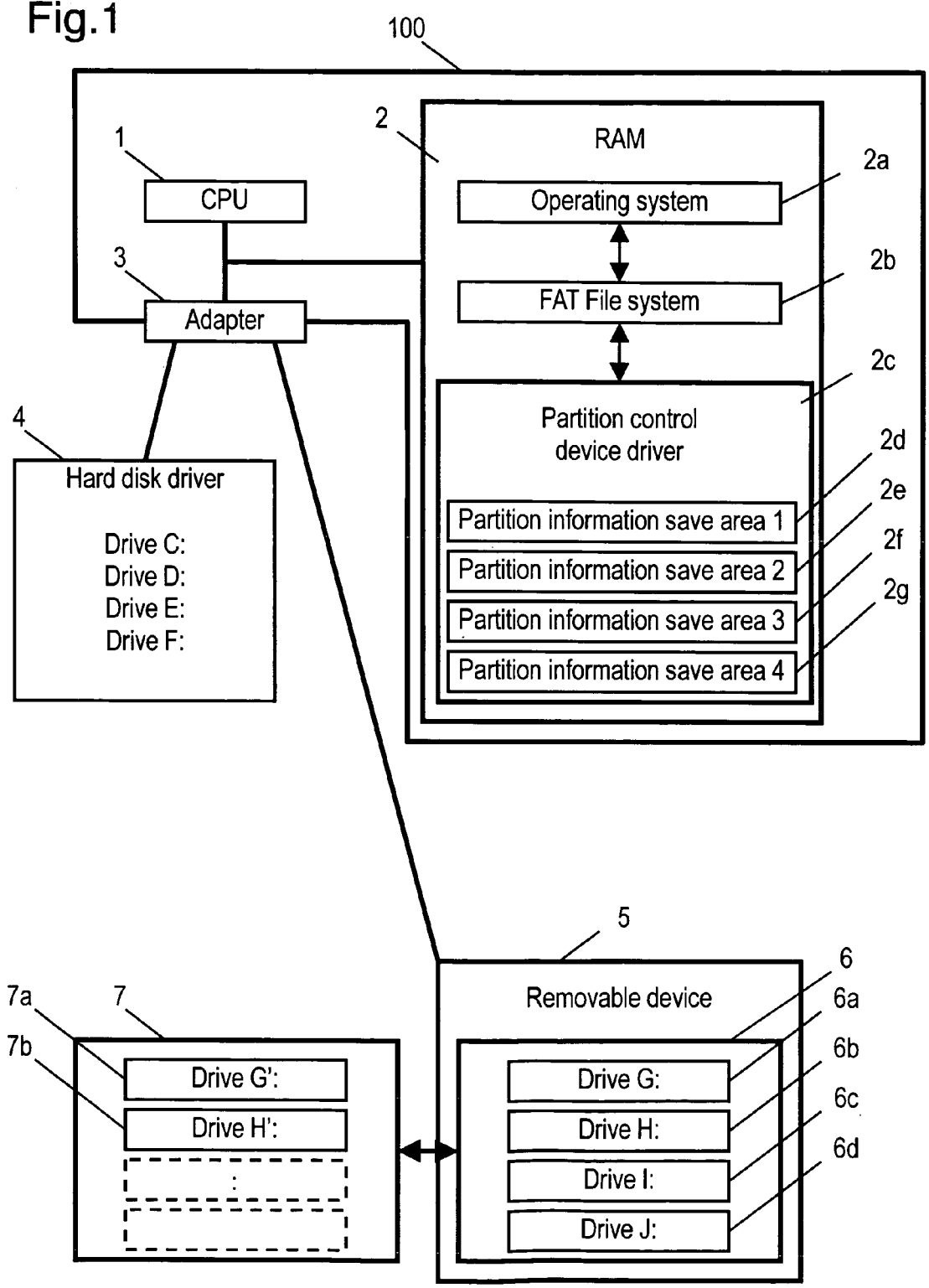
FIG. 1 is a configuration of a computer system in an exemplary embodiment of the present invention.

A computer system of this exemplary embodiment shown in FIG. 1 comprises:

a) a computer-base unit 100 comprised of a CPU ("Central Processing Unit") 1 serving as a center component of a computer and a RAM 2;

b) an adapter 3 for connecting the computer-base unit 110 to peripheral devices, and for accessing from the computer-base unit 100 to the connected peripheral devices;

c) a hard disk drive 4 in connection with the computer-base unit 100 through the adapter; and d) a DVD-RAM device 5 representing a removable device in connection with the computer-base unit 100 through the adapter.

The DVD-RAM device 5, i.e. a removable device, is loaded with a DVD medium 6 having a capacity of 5.2 GB, for example. Besides, there may be a case that the DVD- RAM device 5 is used with another DVD medium of 2.6 GB in capacity after replacing the DVD medium 6 loaded therein.

Figure 2:
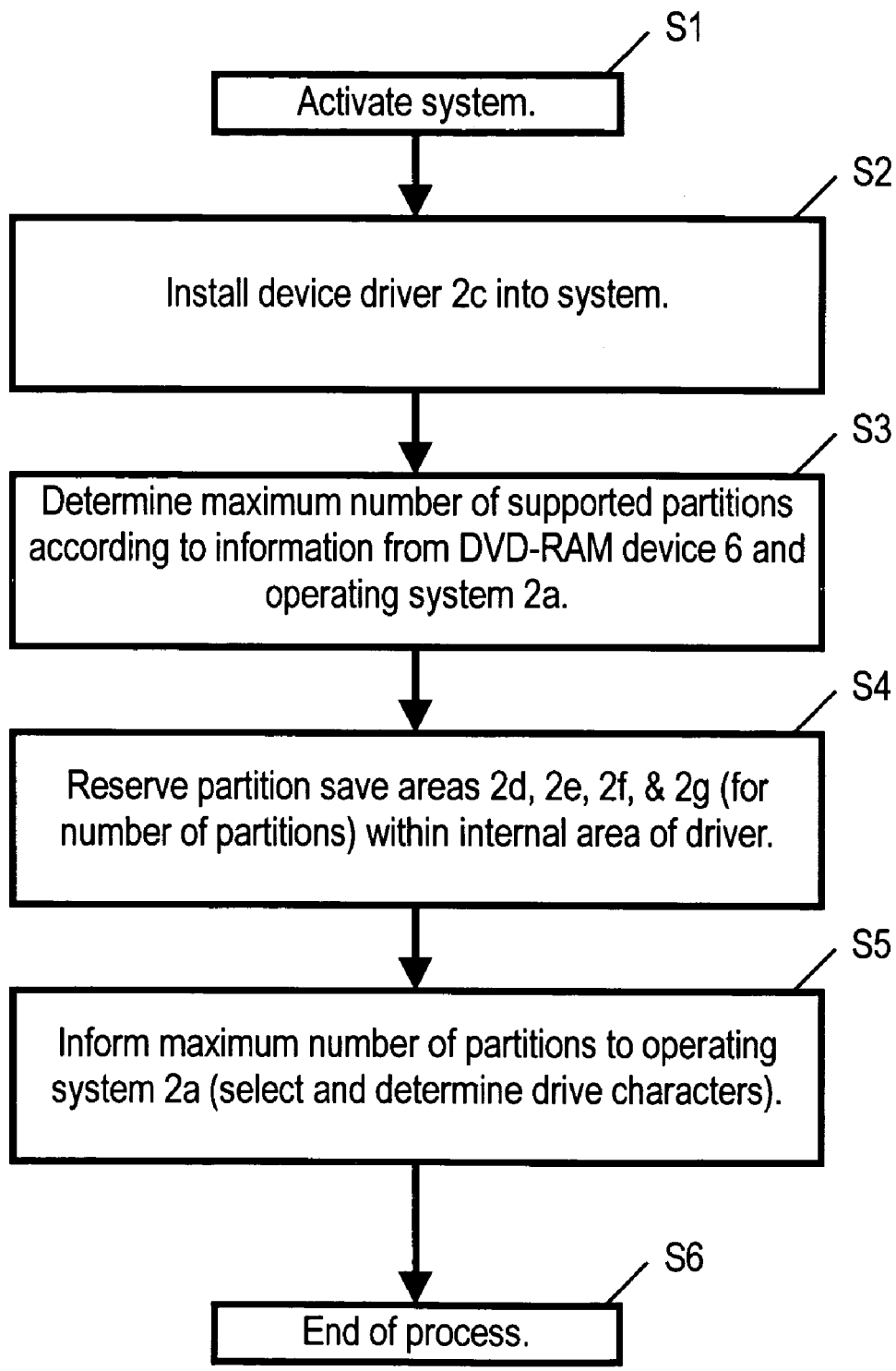
FIG. 2 is a flow chart showing an operation when a device driver for controlling a partition is installed into an operating system upon activation of the computer system in the exemplary embodiment of this invention.

Referring now to a flow chart of FIG. 2, an operation of the computer system of FIG. 1 will be described.

S1: The computer system is activated.

S2: With an activation of the computer system, an operating system 2a, a file system 2b, and a partition control device driver 2c (hereinafter simply referred to as "DDPC") for the DVD-RAM device 5 are installed into the RAM 2 of the computer-base unit 100.

S3: The operating system 2a and the file system 2b allocate a drive letter to the hard disk drive 4 through the adapter 3, and they gives a command against the DDPC 2c for allocation of drive letters to the DVD-RAM device 5. The DDPC 2c, in response to the command, stores in the operating system 2a and the file system 2b, a maximum number of partitions that can be handled regardless of whether or not a DVD medium is loaded in the DVD-RAM device 5.

S4: The DDPC 2c then reserves areas corresponding to the maximum number of partitions within an internal work area of the DDPC 2c. These areas are, for example:
   a partition information save area (hereinafter referred to as "PISA") 1, represented by a reference symbol 2d;
   a PISA 2 shown by a reference symbol 2e;
   a PISA 3 shown by a reference symbol 2f; and
   a PISA 4 shown by a reference symbol 2g, as shown in FIG. 1.

S5: The operating system 2a subsequently allocates to the DVD medium 6 in the DVD-RAM device 5, a plurality of drive letters such as:
   a drive G shown by a reference symbol 6a;
   a drive H shown by a reference symbol 6b;
   a drive I shown by a reference symbol 6c; and
   a drive J shown by a reference symbol 6d, as shown in FIG. 1.

S6: The process ends.

In an architecture shown in FIG. 1, if there are connected only a drive C of the hard disk drive 4 as a medium of fixed device, and one unit the DVD-RAM device 5 as a removable device, for instance, a combination of drive letters of the computer system consists of:
   C: the hard disk drive 4;
   D: PISA 2d in the DVD-RAM device 5;
   E: PISA 2e in the DVD-RAM device 5;
   F: PISA 2f in the DVD-RAM device 5; and
   G: PISA 2g in the DVD-RAM device 5.

In some of operation systems, there is a limitation restricting a maximum number of four partitions per each unit of removable devices, if there is a probability that up to four units of the hard disk drive 4 are connected to a drive C through a drive F. When the computer is restarted after four units of the hard disk drive 4 are connected in total, then the combination of drive letters becomes:
   C: the hard disk drive 4;
   D: the hard disk drive 4;
   E: the hard disk drive 4;
   F: the hard disk drive 4;
   G: the PISA 2d of the DVD-RAM device 5;
   H: the PISA 2e of the DVD-RAM device 5;
   I: the PISA 2f of the DVD-RAM device 5; and
   J: the PISA 2g of the DVD-RAM device 5.

In this case, the combination of the drive letters comes to be different from those of the earlier example above, even for the same partition information save areas of the same DVD-RAM device 5.

Therefore, an operator specifies drive letters in advance, such as G through J for the four units of DVD-RAM device 5, for instance, so as to designate:
   C: the hard disk drive 4;
   G: the PISA 2d of the DVD-RAM device 5;
   H: the PISA 2e of the DVD-RAM device 5;
   I: the PISA 2f of the DVD-RAM device 5; and
   J: the PISA 2g of the DVD-RAM device 5.

If the computer system is so composed as to allow the operator to allocate arbitrary letters as drive letters, in consideration of a number of devices that can be connected as add-ons and the like, a combination of the drive letters allocated to the DVD-RAM device 5 does not change even if the computer is restarted after connecting four units of the hard disk drive 4 in total.

Further, if there are many devices to be connected to the computer system, it may be appropriate to allocate low priority letters S to V to one DVD-RAM device 5, and letters W to Z to a second DVD-RAM device 5, as their drive letters.

Figure 3:
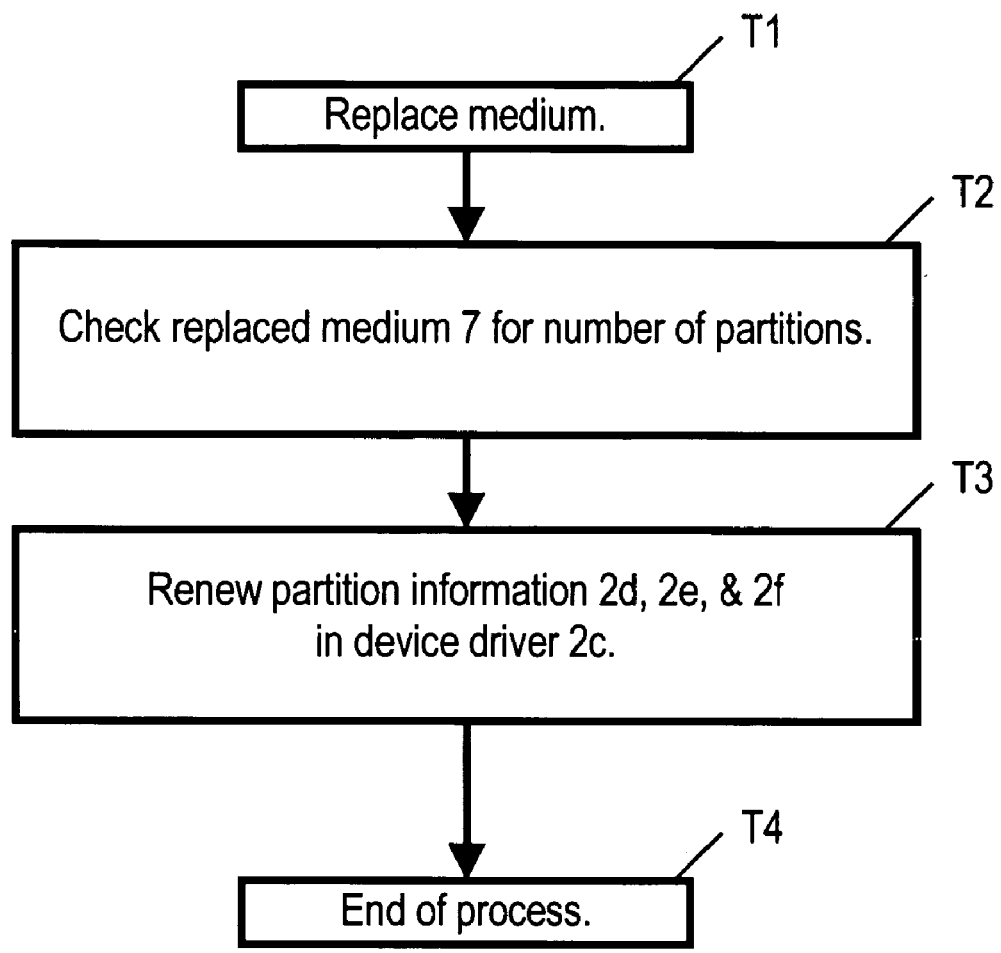
FIG. 3 is another flow chart showing an operation when a medium is loaded into a removable device or another medium different from the one loaded is replaced, after activation of the computer system in the exemplary embodiment of this invention.

Subsequent to the foregoing operation of FIG. 2, described hereinafter pertains to an operation when a new DVD-RAM medium 6 of 5.2 GB is loaded now into the DVD-RAM device 5, according to FIG. 3.

T1: A DVD-RAM medium 6 having a capacity of 5.2 GB is newly loaded.

T2: The DDPC 2c initializes all of the PISA's 2d, 2e, 2f, and 2g within the driver. The DDPC 2c then checks a number of partitions of the loaded DVD-RAM medium 6 of 5.2 GB.

T3: An information signifying that "a partition exists" is written in each of the PISA's 2d, 2e, 2f, and 2g in the DDPC 2c corresponding to the partitions on the DVD-RAM medium 6 of 5.2 GB in capacity.

T4: The PISA's 2d, 2e, 2f, and 2g are allocated with drive letters respectively as drive G, drive H, drive I, and drive J, in this instance, and the process is completed.

Furthermore, described hereafter is a case in that the DVD-RAM medium 6 of 5.2 GB loaded in the DVD-RAM device 5 is replaced with another medium, i.e. a DVD-RAM medium 7 having a capacity of 2.6B.

T1: The DVD-RAM medium 7 of 2.6 GB in capacity is replaced.

T2: The DDPC 2c initializes a number of areas, e.g. a number equal to or smaller than the maximum number of partitions that the operating system 2a supports, that is all of the partitions, PISA's 2d, 2e, 2f, and 2g. The DDPC 2c then checks a number of partitions the newly loaded DVD-RAM medium 7 of 5.2 GB in capacity.

T3: An information signifying that "a partition exists" is written in each of the information save areas 2d, and 2e in the DDPC 2c corresponding to the partitions on the DVD-RAM medium 7 of 2.6 GB in capacity. Another information signifying that "no partition exists" is written in each of the other information save areas 2f, and 2g in the DDPC 2c for nonexistent partition on the DVD-RAM medium 7 of 2.6 GB in capacity.

T4: In other words, information areas on the DVD-RAM media 7 of 2.6 GB capacity can be treated in a manner that:
   the information area 2d is assigned as drive G' as shown by a symbol 7a: and
   the information area 2e is assigned as drive H' as shown by a symbol 7b.

All other drives are recognized as being not loaded with any medium, and the process is now completed.

Described hereinafter pertains to an operation in FIG. 4, when the operating system or the file system issues read/write commands to the device driver.

U1: The computer system is activated.

U2: When the operating system 2a begins to read and write data in a drive letter I on the medium 6 in the DVD-RAM device 5, the operating system 2a issues a communication command to the file system 2b, and the file system 2b also issues a communication command to the DDPC 2c, if there is the medium 6 loaded in the DVD-RAM device 5.

U3: The DDPC 2c verifies whether the command is for one of the drive letters it manages.

U4: If the drive letter I is not found, in the step U3, as being one of the drive letters that the DDPC 2c manages, the DDPC 2c terminates the process, and returns to a process of the operating system.

U5: If the drive letter I is found, in the step U3, as being the drive letter the DDPC 2c manages, the DDPC 2c checks through the PISA's 2d, 2e, 2f, and 2g.

U6: The DDPC 2c checks whether or not a partition exists for the loaded DVD-RAM medium 6 of 5.2 GB.

U7: If the drive checked in the step U6 corresponds to the partition information save area having no partition, a message is sent to the file system 2b to the effect that no medium is prepared.

U8: If the drive checked in the step U6 corresponds to the partition information save area having a partition:

the DDPC2c communicates with the DVD-RAM device 5, and transfers data read from the medium 6 to the file system 2b; and the file system 2b communicates to the operating system 2a.

U9: The processing is completed.

In addition, it is practicable with any existing computer system to form partitions in a removable device, according to this invention, through a supply of various kinds of media containing a program for creating partitions in removable devices.

Furthermore, the program for creating a plurality of partitions in removable devices can be supplied through a communication means such as the Internet and the like networks, besides supplying it stored in a variety of media.

INDUSTRIAL APPLICABILITY

As described above, a method of creating partitions in a removable device of this invention avoids a problem in that drive letters do not match with individual partitions in a removable device and a variety of other devices in an operating system not capable of changing drive letters dynamically at each time a medium is replaced. It can realize a plurality of partitions in a single unit of removable device by treating it as a plurality of drives. Moreover, an operator can allocate usable drive letters freely at his convenience, even when there is a change in number of devices connected to his computer system.

Furthermore, there can be realized a plurality of partitions readily in a removable device in an existing computer system, by offering a medium containing a recorded program for creating a plurality of partitions in removable devices.

What is claimed is:

1. A method of creating partitions in a removable device capable of accepting a removable media, said method comprising the steps of:

communicating in a computer system having an operating system and capable of connecting with a removable device in order to request an allocation of one or more drive letters to said removable device;

storing a maximum number of partitions that can be allocated in said removable media regardless of whether or not said removable media is loaded in said removable device;

reserving, within an internal work area of said operating system, areas corresponding to said maximum number of partitions, indicating in each of said areas, after said removable media is inserted in said removable device, information which indicates whether respective partitions exist on said removable media, wherein, if all available partitions in said removable media are less than said maximum number of partitions, an indication is placed in one of said areas that one of said respective partitions does not exist; and allocating, to said removable media, one or more drive letters based on a number of said areas reserved within said internal work area.

2. The method of creating partitions in a removable device according to claim 1, wherein the number of said drives is equal to a maximum number of partitions supported by said operating system.

3. The method of creating partitions in a removable device according to claim 2, wherein:

said drive letters allocated to the single unit of said removable device remain valid until being reallocated again; and a number of drive letters derived by subtracting a number of partitions on a medium within said removable device from the number of said drive letters is recognized as being absence of any medium.

4. The method of creating partitions in a removable device according to claim 1, wherein said drive letters comprise arbitrary characters allocated by an operator.

5. A computer readable medium having a program recorded therein for creating a plurality of partitions in the removable device as recited in claim 1.

6. The method of claim 1, further comprising the step of using the operating system to allocate to the removable media the plurality of drive letters so that the removable media is divided into partitions corresponding to the number of drive letters.

7. The method of claim 6, wherein the number of allocated plural drives is equal to a maximum number of supportable partitions for the removable device and the operating system is informed of the maximum number of supported partitions.

8. A method of creating partitions according to claim 1, wherein said drive letters are sequential with further drive letters allocated to hard disk drives.

* * * * *